United States Patent Office 3,396,740
Patented Aug. 13, 1968

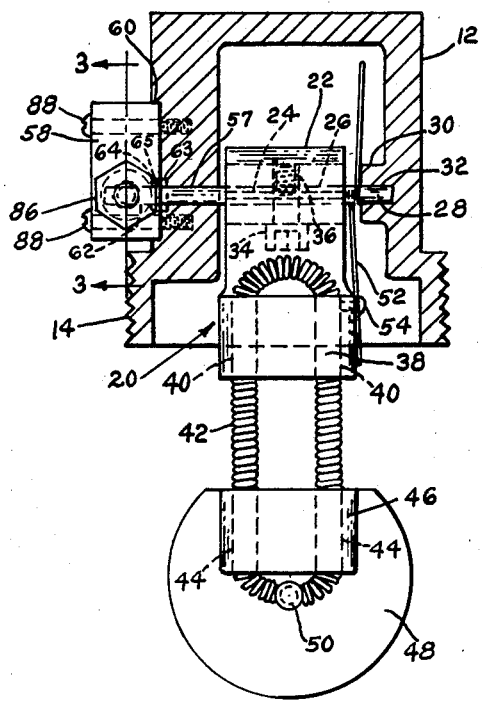

3,396,740
VALVE APPARATUS RESPONSIVE TO
FLUID FLOW
Harold J. Olson, Broadway, Raynham, Mass. 02767
Filed Apr. 15, 1965, Ser. No. 448,460
7 Claims. (Cl. 137—87)

ABSTRACT OF THE DISCLOSURE

Valve apparatus is operable by flow of fluid to control the speed of a motor during a pumping operation. A flap is actuated by said liquid flow and is operably connected to rotate a shaft, which actuates an air valve to open an air passage to establish a vacuum line adapted to communicate with a vacuum of an automobile motor whereby speed of the latter is controlled.

---

This invention relates to a valve device responsive to fluid flow.

Reference is made to my Patents No. 2,842,150 dated July 8, 1958, and No. 3,065,316 dated Nov. 20, 1962.

One object of my invention is to provide improved valve apparatus that is moved to open position by the normal pressure of a flowing liquid, and automatically returns to closed position when the flow ceases. It is adapted for connection to a motor whereby a vacuum line can be automatically established between a motor manifold and my apparatus to thereby open throttle mechanism and thus increase the motor speed.

My special object is to improve such apparatus by operably combining an air valve device with mechanism that is directly responsive to fluid flow.

Another object is to locate the air valve device and casing therefor, used with my apparatus, outside of the main housing, so that connections running to the motor manifold may easily be made, and the air valve device can conveniently be repaired or adjusted should that ever be desirable.

A further object is to provide such apparatus that is formed of relatively simple parts that are obtainable in some instances, upon the market or are relatively inexpensive to manufacture.

The foregoing and other objects, which will appear as the nature of the invention is better understood, may be accomplished by a construction, combination and arrangement of parts such as is disclosed by the drawing. The nature of the invention is such as to render it susceptible to various changes and modifications, and, therefore, I am not to be limited to the construction disclosed by the drawing nor to the particular parts described in the specification; but am entitled to all such changes therefrom as fall within the scope of my claims.

In the drawing:

FIG. 1 is a front elevational view of my valve apparatus, shown in closed position, the main housing being shown in section.

FIG. 2 is a side elevational view of said apparatus, as shown in FIG. 1, with the addition of a T-fitting shown in section, the dash lines indicating the position of the actuating mechanism that is responsive to fluid flow.

FIG. 3 is an enlarged, sectional view taken on the line 3—3 of FIG. 1.

FIG. 4 is a side elevational view of the valve actuating shaft.

FIG. 5 is a perspective view of the connecting cup that is located between the shaft actuating portion and the valve opener.

As illustrated, my valve apparatus, which is operable by flow of fluid, has a main housing or support having an upper portion 12 that is screw-threaded as at 14 to which a lower portion or T-shaped fitting 16 is connected. Oil or other fluid flows through the latter from a source of supply such as a tank carried by an automobile truck.

Extending into said housing 12 is fluid-flow, actuating mechanism having a movable connector or mounting member 20 and responds to fluid flow. Said connector 20 has an upper portion 22 having a laterally extending slit 24 therein, and a hole 26 extending through said connector and that communicates with said slit 24.

A rotatable shaft 28 extends through said hole 26, being fixed to said connector 20 so that the latter rotates with said shaft. The latter extends into a hole 32 in a boss portion 30 of said housing 12. A screw 34 extends into a portion divided by said slit 24 and screw-threadedly connects with screw-threads 36 in the other portion that is at the opposite side of said slit 24 to thereby constrict said hole 26 and thus hold said shaft 28 fixed therein.

A lower and offset portion 38 of said connector 20 has two holes 40 extending therethrough. A coil spring 42 extends through said holes, forming a loop beyond said connector lower portion 38. The two ends of said spring 42 pass through holes 44 made in a boss 46 of a flap or leaf 48 and said ends are fastened to a pin 50 projecting from said flap 48. A tension spring 52 bears at one end on said housing 12, and passes around said shaft 28 and bears at its other end on a laterally extending pin 54 set in said mounting lower portion 38. This spring 52 normally keeps said flap 48 in predetermined position as indicated by the full lines shown in said FIG. 2.

Said shaft 28 has a valve actuating portion 55 that is formed by cutting away or reducing in cross-sectional area an end of the shaft which leaves a flattened or slabbed portion 56. Opposite the latter is said high or actuating portion 55.

Said housing 12 has a shaft hole 57 extending through a side of said housing 12 to movably accommodate said shaft 28.

At the outside of said housing 12 is a valve casing 58 that extends into a recess 60 formed in a side of said housing 12. Extending laterally into said casing, commencing an inner side thereof, is a shaft hole 62 that communicates with said housing hole 57 and which receives said shaft 28 including said actuating portion 55. An O-ring 63 fits in said housing hole 57 and another O-ring 64 fits in said casing hole 62 to thus seal said holes.

A longitudinal passage 66 extends through said valve casing 58 which communicates with said shaft hole 62. It has an intermediate passage portion 67 of smaller and varying diameter. A well-known type of air valve device 68 extends into said casing hole intermediate portion 67. It has the usual screw-threaded, attaching portion 70 that screw-threadedly connects with a short portion of screw-threads in said hole 66. A hollow body portion 72 of said valve 68 receives a movable valve opener or stem 74 shown projecting beyond said body 72 at both ends and the movement of which serves to open and close said valve passage 66 and permit the flow of air when in open position. Said valve opener 74 is kept in normal or closed position by the usual spring, not shown. It has the usual seating member 76.

Extending movably into said casing intermediate passage 67 is a connector cup 80 having a recess 82 therein into which the end of said opener 74 normally enters. Said shaft slabbed portion 56 normally contacts a flat outside surface of said cup 80 as shown in said FIG. 3, thus leaving said valve passage closed.

Couplings 84 and 86 screw-threadedly connect in screw-threaded holes 85 and 87 respectively at opposite ends of said casing 58. Screws 88 pass through holes 90 in said casing 58 and screw-threadedly connect with said housing 12.

In operation, when the motor of a truck is idling, for instance, and operably connected to a pump, a fluid such as oil, may be pumped through said T-fitting 16. The flowing fluid moves said flap 48 to operative position, as shown in dash lines in said FIG. 2, and in turn said connector 20 and shaft 28 are rotatably moved, which turns the actuating portion 55 of said shaft so that the high or curved part contacts said cup 80, pushing it inwardly to thereby push said opener 74 inwardly to thus open the valve passage 66. Upon the opening of said valve passage 66 a vacuum line is established from a vacuum manifold, not shown, thus communicating with the usual automobile motor through a said coupling 84.

Said other coupling 86 may be connected to a throttle or other mechanism to control motor speed such as disclosed in my U.S. Patent No. 3,101,670 granted Aug. 27, 1963. Thus the opening of said valve passage 66 while the motor is running, will open the usual motor throttle to thereby increase motor speed and the pumping operation to thus operate the oil pump at the most efficient pumping speed.

When the flow of liquid ceases the flap 48, connector 20, shaft 28 and shaft actuating portion 55 return to normal position, which releases said valve opener 74, thus closing the valve passage 66.

What I claim is:

1. A valve apparatus for permitting flow in a first line in response to flow in a second line, said valve apparatus comprising a housing having an upper and a lower portion, said lower portion forming a part of said second line, an actuating mechanism supported by said housing and having a movable connector portion extending into said lower portion, a flap attached to and extending below said connector and being responsive to flow in said lower portion, said upper portion of said housing having a laterally extending bore therethrough in which a shaft is rotatably mounted, said shaft being fixed to and movable with said connector, a valve casing attached to said housing and having a bore aligned with said housing bore, said casing bore being located at an angle to and communicating with a passage located in said casing, said passage forming a portion of said first line and having an air valve device located therein, said shaft having a valve actuating portion located in said casing bore and extending into said passage, said device having a movable opener so positioned as to be operated by said actuating portion upon movement of said shaft to thereby open said passage.

2. A valve apparatus as set forth in claim 1, said actuating portion having a flat part normally opposite said opener.

3. A valve apparatus as set forth in claim 1, said valve casing being attached to a side of said housing.

4. A valve apparatus as set forth in claim 1, said connector having a hole extending laterally therethrough, said shaft extending through said latter hole.

5. A valve apparatus as set forth in claim 4, said connector having a slit extending inwardly from an outer side thereof and communicating with said connector hole, and fastening means extending into said connector at opposite sides of said slit and constricting said connector hole to thereby fixedly hold said shaft in the latter hole.

6. A valve apparatus as set forth in claim 1, and a connector cup between said actuating portion and said opener adapted to force said opener to open position when said actuating portion is moved to actuating position.

7. A valve apparatus as set forth in claim 6, said shaft having a curved, high portion and a flat portion, said connector cup having a flat portion that is parallel with and adjacent said flat portion of said shaft in normal position.

References Cited

UNITED STATES PATENTS

| | | | |
|---|---|---|---|
| 877,063 | 1/1908 | Edes et al. | 137—446 |
| 1,259,910 | 3/1918 | Sack | 137—87 |
| 1,478,989 | 12/1923 | Nash | 137—446 |
| 1,534,212 | 4/1925 | Hess | 137—527.8 X |
| 1,605,254 | 11/1926 | Martell | 137—527 X |
| 2,605,479 | 8/1952 | Ansorge | 251—251 X |
| 2,756,769 | 7/1956 | Martin et al. | 137—446 |
| 2,842,150 | 7/1958 | Olson | 137—87 |
| 3,110,036 | 11/1963 | Downin | 137—446 X |

FOREIGN PATENTS

| | | |
|---|---|---|
| 882,482 | 3/1943 | France. |

WILLIAM F. O'DEA, *Primary Examiner.*

DAVID J. ZOBKIW, *Assistant Examiner.*